Oct. 22, 1957 G. I. ROBERTS 2,810,848
METHOD AND MEANS OF MAKING STATOR COIL END TURNS
Filed June 1, 1954
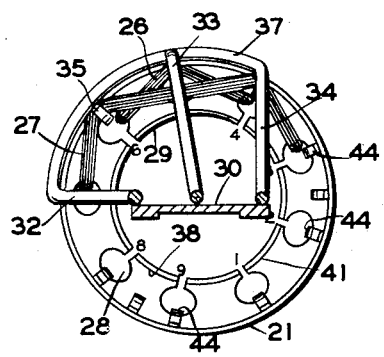
FIG. 1
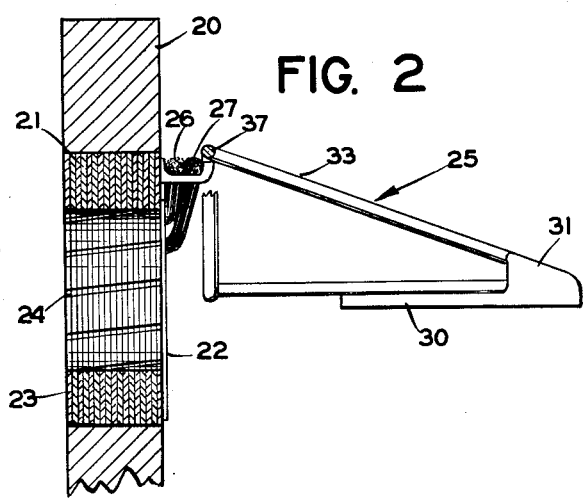
FIG. 2
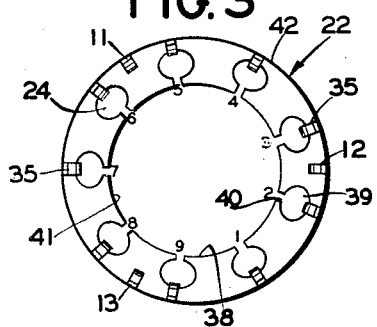
FIG. 3
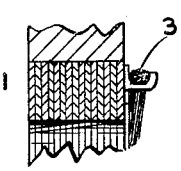
FIG. 4
FIG. 5
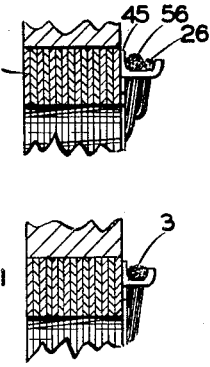
FIG. 6
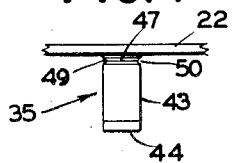
FIG. 7  FIG. 8
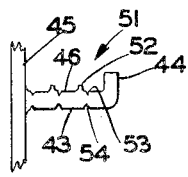 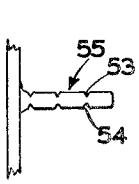
FIG. 9  FIG. 10
INVENTOR.
GEORGE I. ROBERTS
BY Herbert Smith
ATTORNEY

United States Patent Office 2,810,848
Patented Oct. 22, 1957

2,810,848

METHOD AND MEANS OF MAKING STATOR COIL END TURNS

George I. Roberts, Maywood, N. J., assignor to Bendix Aviation Corporation, Teterboro, N. J., a corporation of Delaware Application June 1, 1954, Serial No. 433,775

11 Claims. (Cl. 310—260)

This invention pertains to the art of coil winding and more particularly to method and means for forming and holding end turns of coils on an electrical insulator adjacent to a face or end of a stator stack.

Instrumentation, particularly in the field of aviation, requires devices that are small, compact, and efficient, yet extremely robust. Some electrical instruments, such as inductive devices having stators present unique problems in winding the coils thereof which usually are of very fine wire. The manufacture of these devices frequently requires care and specialized techniques. The present invention concerns a method and means for overcoming certain of the difficulties encountered in the winding of stators for electrical devices.

The present invention may be used, for example, in conjunction with a coil winding machine of the general type described in my co-pending patent application Serial No. 425,527 for Stator Coil Winding Device, and is of the general nature of the invention set forth in the co-pending patent application of George I. Roberts and Thomas J. Madden, Serial No. 425,672 for Method and Means of Stator Coil Forming.

In the aforementioned patent applications, the stator to be wound is removably affixed within a stator nest which is stationarily positioned in the winding machines. The stator nest is used for supporting and positioning means including hooks, which support the end turns or loops of coils wound in the slots of a stator, and which may be rotated for suitable indexing to position the stator for the particular coil, of a series of coils to be wound according to a desired sequence or predetermined program of coil winding.

The present invention differs generally from the above-mentioned Roberts and Madden patent application Serial No. 425,672 in that in the present invention, the means for forming the end turns of the coils may be carried entirely by a preformed insulator having lugs and which is entirely within the lateral confines of the stator. Consequently, the stator nest is not utilized to carry the lugs on which the end turns of the coils are formed.

The present invention, while it may be used in conjunction with a coil winding device of the general type mentioned above, may or may not employ a stator nest in the form indicated due to the inherent characteristics of the instant novel invention and the method employed. Consequently, with the present invention, it may be used in conjunction with a coil winding machine that does not employ a stator nest, since the stator may be stationarily held during the winding operation by a belt or other strap means.

An object of the present invention is to provide novel method and means to facilitate the production of coil winding.

Another object of the invention is to provide a novel method and means for forming the loops or end turns of a coil of a stator and which may include an electrical insulator.

Another object is to provide a novel method and means for forming the end turns of a coil by utilizing a wire carrying preformed structure.

Another object is the provision of a preformed structure for forming the end turns of a coil and which may have a disposable portion to be removed after completion of the winding.

A further object is to provide a preformed end turn forming structure for coils and which may be of electrical insulating material permanently secured to a stator stack, such as by adhesion.

A further object is to provide a method and means of forming end turns of a coil on an electrical insulator which may be partially disposable and which may utilize a novel guide means for the wire during the winding operation.

A further object of the invention is the provision of a preformed electrical insulator permanently fastened on, and within the lateral confines of, a face of a stator, and having a base with lateral projections disposed in predetermined positions for receiving the end turns of coils to form same so as to be free from obstructing the intervening slots usable in the winding of succeeding coils of the stator.

The present invention contemplates a novel method and means for forming the end turns or loops of coils as they are being wound in the slots of a stator stack by an automatic winding machine.

The insulator end form is an annular electrical insulator having a base portion with a large central opening therein, and a plurality of smaller openings communicating with the large central opening. The insulator end form is secured to and lies within the confines of each end face of a stator stack. The base portion has lateral projection or lugs thereon, with one projection positioned adjacent each of the smaller openings which terminate the slots of the stator stack, and other lateral projections which may be suitably disposed on the same side of the base in an array dictated by the requirements for the coils of the particular stator. The base and lugs are preferably preformed by a molding process and the entire unit is suitably aligned with and secured to opposing end faces of the stator stack consisting of laminations.

The lugs may have shoulder portions thereon to be used with the form guide means described in my co-pending applications mentioned above, or the lugs may be free of said shoulder portions and may be used with a type of form guide means of the present application.

The foregoing and other objects and advantages of the invention will appear more fully hereinafter from a consideration of the detailed description which follows, taken together with the accompanying drawings wherein various embodiments of the invention are illustrated. It is to be expressly understood, however, that the drawings are for the purpose of illustration and description, and are not to be construed as defining the limits of the invention.

In the drawings:

Figure 1 is a front view of the insulator end form secured to a face of a stator stack with representative coils thereon and a portion of a form guide means of a winding machine operatively positioned relative thereto.

Figure 2 is a vertical sectional longitudinal view of Figure 1, with a stator nest supporting the stator stack.

Figure 3 is a front view of one type of the insulator end form.

Figures 4 and 5 are lugs having shoulders similar to the shoulders of the lug in Figure 2, but of different dimensions to suit different coils and combinations thereof.

Figure 6 shows a lug without a shoulder relative to a form guide means different from that shown in Figure 2.

Figures 7 and 8 are top and side views, respectively, of a shouldered lug with shear sections.

Figure 9 is a modification of a shouldered lug having dividers and shear sections.

Figure 10 is a modification of an elongated lug without a shoulder and having shear sections.

Referring to the drawings, and more particularly to Figs. 1 and 2, there is shown a stator nest 20 having positioned therein a stator stack or stator 21 having an insulator end form 22 secured to the end lamination on the right hand face of the stator. While only one insulator end form such as 22 is shown on the right hand face of the stator in the various views, it is to be understood that there is also a similar insulator end form on the left hand face of the stator 23. The slots, such as 24, are shown as skewed slots but it is clear that the elongated stator slots may be axially disposed.

The stator nest 20, as explained in the patent applications referred to hereinbefore, is adapted to have positioned therein a stator. The stator nest per se is rotatable within the supporting structure of the winding machine to suitably index the stator nest and its stator so that the various coils may be wound in the proper slots for the particular coils according to a prearranged plan or schedule of winding.

The form guide means 25 is shown to the right of the stator in Fig. 2, and it is to be understood that there is also a similar form guide means positioned adjacent to the left hand face of the stator so that the end turns of coils may be formed on both left and right hand sides of the stator.

In the coil winding machine mentioned above, there is employed a feeder means or continuous chain which is motor driven. The feeder means or continuous chain is mounted so that the wire from which the coils are to be formed is carried over both the left and the right form guide means, such as 25, which are positioned on opposite sides of the stator and disposed so that as the chain revolves the wire is urged over the respective form guide means and deposited on each of the insulator end forms such as 22, thereby forming the left and right hand end turns or loops of a particular coil.

In Fig. 1, there is shown the end turns of two coils on one face of the stator, one of the end turns represents a 2-pitch coil, 26, and the other of the end turns represents a 4-pitch coil 27. While only a 2-pitch coil and a 4-pitch coil are represented in Fig. 1, the particular insulator end form has an application which also includes a 3-pitch coil.

The form guide means which would be used for the example illustrated herein would require three different sets of form guide means, each set consisting of two identical form guides. Each of the sets of form guide means is particularly designed for the pitch of the coil for which the form guide means is intended for use.

In order to clarify the language of the present application it is to be understood that in Fig. 1 there are involved three slots such as 28 of the nine slots of the limiting stack forming the stator. There is one intervening slot, of the three slots, which is not involved in the winding of the particular coil shown for the 2-pitch coil 26, thus leaving two divisions such as 29, between the outside slots in which the 2-pitch coil 26 is formed.

The form guide means shown in Fig. 1 is for the 4-pitch coil, and said form guide means has a guide plate or base 30 with an inclining shoulder 31 formed thereon. A network of ribs is shown having three separate longitudinal rib portions, each of which are inclined. One of the rib portions forms a slot guide surface 32 connected to the base 30 and extends outwardly therefrom so that as the wire for the coil is drawn over the slot guide surface, the wire will be guided into a particular slot. The central longitudinal rib 33 and the right hand rib 34 provide form guide surfaces, so that after the wire of the coil-to-be-wound engages the inclined shoulder 31, it is then drawn upwardly over and then off of the form guide surfaces, and is drawn onto the projecting lugs in the path of the wire. Rib 34 also acts as a slot guide to guide the wire out of the particular slot. For example, rib 34 will guide the wire out of the end of slot 36, so that the wire will not overlap a division such as 29, and will lay in the proper slot.

A cross rib portion 37 is shown integral with the right hand rib 34 and also with the rib forming the slot guide surface 32. However, any other suitable arrangement of ribs or surfaces may be provided. The form guide means 25 is a unitary structure of which there are two, one being disposed on each side of the stator as it is supported by the stator nest ready for winding a coil in the stator.

Referring to Fig. 3, it will be seen that the insulator end form 22 is annular and has a large central opening 38 and a plurality of smaller openings 39 with a communicating passage 40 communicating both the large central opening 38 and the smaller openings 39 to permit the wire of the coil-to-be-wound to pass into the respective smaller openings which terminate the stator slots.

The large central opening 38 forms an interrupted circular peripheral edge 41 in a lateral cross section of the stator, while the outer peripheral edge 42 forms a peripheral edge in a continuous circle.

In the center of each of the smaller openings 39 at the outer edge thereof, there is disposed a lug which may be represented by the lug 35. There is one lug on the insulator end form for each of the nine slots in the stator. An equal number of the smaller openings 39 formed in the insulator end form, coincide with their respective stator slots 24. Each of the lugs is substantially radially aligned with its associated slot and communicating passage 40. The lugs shown in Figs. 1, 2, and 3 each have a finger portion 43 (also see Figs. 7 to 9) and a shoulder 44 which shoulder extends outwardly from and substantially at right angles to the finger portion so that the shoulder acts as a stop to retain the wire on the lug, while the end of the finger portion opposite the shoulder is secured on or preformed with the base 45 which forms the main supporting structure of the insulator end form. The outer surface 46 of the finger 43 is disposed to lie substantially in the same longitudinal plane as the outer edge of the small openings 39, so that the end turn is approximately clear of the slot.

In Figs. 7 and 8 there is shown, on each lug 35, an upper shear section 47, and a lower shear section 48 with a left hand shear section 49 and a right hand shear section 50. By means of the shear sections, which are actually reduced portions of the finger, the finger may be broken off at the shear section after the particular coils are wound, if this is desired.

Fig. 9 shows a lug 51 which is fundamentally similar to lug 35, shown in Figs. 7 and 8, except that the lug of Fig. 9 employs dividers 52 on the outer surface thereof and has other shear sections. On the lug 51 there is also shown an outer shear section 53 and an inner shear section 54 so that if it is desired to break off the shoulder portion of the lug and leave the remainder of the lug intact with the base 45, the dividers such as 52 will act as stops or limiting means for the coils.

Fig. 10 shows a lug 55 which does not have a shoulder thereon but does have outer shear section 53 and inner shear section 54, similar to the shear section of the lug in Fig. 9.

Figs. 2, 4, and 5 show the insulator end form having lugs which have the finger portions of different lengths. This is desirable because in production operations large quantities of stators are scheduled for manufacture at the same time, since they would be of the same type requiring duplication of the insulator end form for the stator units. Because of this duplication, a large number of insulator end forms would be manufactured according to the requirements for the particular unit. In preparation for winding the coils of a particular electrical unit, a sequence chart for the coils is made. In some cases, a certain lug may carry only one coil, while in other cases it may carry two or more coils. Further, the number of turns per coil may vary.

In the present showing, the example employed uses coils of 2-pitch, 3-pitch, and 4-pitch. Assuming that the wire is all of the same size, the 2-pitch coil has twelve turns, the 3-pitch coil has 32 turns and the 4-pitch coil has 52 turns. Naturally, the diameter of the coils in each instance would be different.

In Fig. 2, there are shown two coils, namely coil 26 is a 3-pitch coil having 32 turns, and coil 27 is a 4-pitch coil having 52 turns. The 3-pitch coil is placed nearer to the base of the insulator end form than the 4-pitch coil, as will be seen from the information presented herein concerning the sequence of winding.

In Fig. 4 a 3-pitch coil 56 is shown nearer the base of the insulator end turn and a 2-pitch coil 26 is shown on the same lug, while in Fig. 5 the lug carries only a 3-pitch coil.

While the lugs shown in Figs. 2, 4, and 5 do not have dividers, it should be clear that the form of lug shown in Figs. 9 and 10 could also be employed so that they may be broken off at the desired shear section if this step became expedient in the particular method employed.

Normally, after the stator is secured in the stator nest, the stator nest may be rotated in the supporting structure of the winding machine in any convenient manner, or, for example, may be rotated in accordance with the showing in the aforementioned patent application of Roberts, Serial No. 425,527.

In accordance with the winding sequence, for the example shown in the present application, it will be noted that the stator slots are numbered counterclockwise from one to nine inclusive. The stator and its stator nest would be simultaneously indexed to various positions for the particular steps of winding, and the form guide means would be changed accordingly so that the form guide means for the particular pitch coil would be used.

In Fig. 1 the two coils shown represent either the fourth, fifth or sixth index positions, since these positions call for duplication of windings, but in different slots.

In progressing through the winding operations according to the index positions, in the particular example presented herein, a 3-pitch coil may be wound in slots 5 and 8 in the first index position. After the stator had been rotated to the second index position, a second 3-pitch coil would be wound in slots 8 and 2, and a third 3-pitch coil would be wound in slots 2 and 5. At this stage we have three 3-pitch coils equally spaced on the stator with one longitudinal side of each of two adjacent coils being formed in the same slot, and this completes the winding of all of the 3-pitch coils for the particular stator.

In index position 4, which is like that shown in Fig. 1, the form guide means is changed for winding a 2-pitch coil, and then a 2-pitch coil is wound in slots 4 and 6. In this same index position 4, the form guide means is changed for the 4-pitch coil, and a 4-pitch coil is then wound in slots 3 and 7. It will be noted that the 4-pitch coil is shown in front of the slot 5, and this is permissive since the 4-pitch coil is the last coil that is wound in this particular index position.

In index position 5 the form guide means is again changed for winding a 2-pitch coil, and a 2-pitch coil is then wound in slots 7 and 9. The form guide means is then changed for a 4-pitch coil and a 4-pitch coil is wound in slots 6 and 1.

In index position 6 the form guide means are again changed for winding a 2-pitch coil, and a 2-pitch coil is then wound in slots 1 and 3, and thereafter the form guide means is again changed for the 4-pitch coil, and a 4-pitch coil is then wound in slots 9 and 4.

From the foregoing it will be seen that the lugs would carry either one or two coils as set forth in Figs. 2, 4, and 5. It is pointed out that in winding the 3-pitch coil in index position 1, employing slots 5 and 8, the intermediate lug 11 is used as well as the lugs adjacent slots 6 and 7. For the remaining 3-pitch coils in index positions 2 and 3, the intermediate lugs 12 and 13 each are used for forming the 3-pitch coils which are wound in slots 8 and 2, and also slots 5 and 8.

In the modification shown in Fig. 6, the lug 60 does not have a shoulder thereon and in this instance a different type of form guide means is employed.

In the form guide means shown in Figs. 1 and 2, the cross rib 37 extends slightly beyond the edge of the shoulder toward the base of the insulator and form so that as the wire is drawn off of the form guide means it will be dropped onto the finger portion of the lug.

In the form shown in Fig. 6 the form guide means 58 employs longitudinal ribs such as 57 having a limiting means portion 59 which is a continuity of the longitudinal rib 57. The longitudinal rib 57 and its limiting means 59 is disposed so that it extends axially slightly beyond the edge of the end of the lug so that as the wire is drawn off of the longitudinal ribs and falls onto the lug, the limiting means 59 will prevent the wire from sliding off the end of the lug. After the particular coil is wound, and the form guide means is removed, the wire normally will remain in position as wound. The limiting means on the longitudinal ribs is used only during the winding operation.

The unshouldered lug shown in Figs. 6 and 10 therefore have a special application where the dimensions of the housing in which the instrument employing the stator is used, are such that the restrictions would normally preclude the additional space for the shoulder of a lug. In this case the straight or unshouldered lug may be used. However, where the dimensional requirements are not so strict in a housing for the device, the lugs having shoulders thereon may be employed in any of the forms shown. While only one specific insulator end form is shown having one lug for each of the stator slots, and three intermediate lugs, it is to be understood that any arrangement or type of insulator end form may be employed depending on the requirements of the particular stator.

The insulator end form may be fabricated with the moulding as a unitary member or it may be built so that the lugs are independently manufactured and positionally secured to the base portion, or any other convenient method or means may be employed in the particular construction of the insulator end form.

One form of a device in which the present invention may be used is an inductive device of comparatively very small design and wherein permissive installation dimensional requirements for the instrument per se and consequently the components which form the instrument, are such that small fractions of an inch are of prime importance. These dimensional requirements are important in the area of the faces of the stator, hence the importance of end thru forming of the coils by the method and means of the present invention, and the attendant time saving factor as well as improvement in the quality of the resultant product. By employing the method of the present invention it is possible to adequately meet these dimensional requirements.

The method of forming the end turns of coils of wire includes steps of providing an adhesive on either the end face surface of a stator stack or the end turn forming means or preformed member, or both. By means of the characteristics of the preformed member as determined by the lugs thereon, geometrical designs may be formed for the various end turns of the coils of wire. As set forth herein, the geometrical designs may be formed for the various end turns of the coils of wire. As set forth herein, the geometrical design for a 2-pitch coil would be different from that of the 3, or 4-pitch coil. The preformed member may accommodate coils of any pitch. Naturally, the particular pitch of a coil would depend on the electrical requirements of the device. By employing the method and means set forth, the preformed member may be aligned with and secured to a stator stack. The outside dimensions and those of the central bore of the preformed member should not be greater than the lateral dimensions of the end face of the stator stack. The surfaces of the stator stack and the preformed member may be secured by any convenient means, such as by an adhesive applied in any convenient form, or it may be mechanically secured.

In aviation instrumentation the necessity of using fine wire for small instruments heightens the complicity of coiling winding. However, with the device of the present invention, the problems encountered heretofore with dropped coils, loose last turns, unsecured coil terminal portions, and other factors, are completely eliminated.

From the foregoing, it is apparent that the present invention provides a method and means for shaping and retaining the coils and portions thereof, so that the winding operations of stator coils are greatly facilitated, possibility of error reduced, winding time per stator decreased, and an appreciable reduction in the cost of manufacturing by savings in labor and material.

While the various embodiments of the invention have been illustrated and described in detail, it is to be expressly understood that the invention is not limited thereto. Various changes can be made in the design and arrangement of the parts without departing from the spirit and scope of the invention as the same will be understood by those skilled in the art.

What is claimed is:

1. A preformed member adapted to be secured to the end face of a stator having slots for receiving wire to be wound in the stator slots, said preformed member having formed therein a central opening and a plurality of smaller openings communicating with said central opening, and a plurality of lugs with shoulders thereon formed on one face of said preformed member and individually disposed in the immediate outer area of each of said smaller openings to confine the movement of the wire as it is wound in stator slots.

2. A preformed member of electrical insulating material adapted to be secured to the end face of a stator having slots for receiving turns of a coil of wire to be wound in the stator slots, said preformed member having formed therein a central opening and a plurality of smaller openings disposed around and communicating with said central opening, and a plurality of lugs with shoulders thereon formed on one face of said preformed member and disposed normal thereto and adapted to receive turns of wire and retain same within an area defined by the location of said lugs.

3. A preformed member adapted to be secured to the end face of a stator having slots for receiving turns of wire, said preformed member having formed therein a central opening and a plurality of smaller openings disposed around and communicating with said central opening, and a plurality of lugs formed on one face of said preformed member with certain of said lugs having shoulders thereon to limit axial and radial movement of the wire relative to said smaller openings.

4. A preformed member of electrical insulating material adapted to be secured to the end face of a stator having slots for receiving turns of a coil of wire to be wound in the stator slots, said preformed member having formed therein a central opening and a plurality of smaller openings disposed around and communicating with said central opening, and a plurality of lugs each having a shear section and formed on one face of said preformed member and disposed at an angle thereto.

5. In an electrical device having a stator with a central bore and a plurality of openings therein each communicating with said central bore and with the opposed end faces of said stator, and a preformed member secured to each of said end faces and each having a central opening and a plurality of smaller openings therein disposed about said central opening, with each of said smaller openings communicating with said central opening, said preformed member having a plurality of lugs with shoulders thereon carried on the outer surface thereof to receive turns of wire and retain same within axial areas as determined by the location of said lugs.

6. In an electrical device having a stator with a central bore and a plurality of openings therein each communicating with said central bore and with the opposed end faces of said stator, and a preformed member secured to each of said end faces and each having a central opening and a plurality of smaller openings therein disposed about said central opening, with each of said smaller openings communicating with said central opening, said preformed member having a plurality of lugs thereon carried on the outer surface thereof, certain of said lugs having a shear section to facilitate removal of a part thereof.

7. In an electrical device having a stator with a central bore and a plurality of openings therein each communicating with said central bore and with the opposed end faces of said stator, and a preformed member secured to each of said end faces and each having a central opening and a plurality of smaller openings therein disposed about said central opening, with each of said smaller openings communicating with said central opening, said preformed member having a plurality of lugs with shoulders thereon carried on the outer surface thereof adjacent the outer diameter of said smaller openings, said preformed member lying within the lateral confines of each stator face.

8. In an electrical device having a stator with a central bore and a plurality of openings therein each communicating with said central bore and with the opposed end faces of said stator, and a preformed member secured to each of said end faces and each having a central opening and a plurality of smaller openings therein disposed about said central opening, with each of said smaller openings communicating with said central opening, said preformed member having a plurality of lugs with shoulders thereon carried on the outer surface thereof, one lug being disposed in the area of each of said smaller openings, said preformed member lying within the lateral confines of each stator face.

9. A preformed member adapted to be secured to the end face of a stator having slots for receiving wire to be wound in the stator slots, said preformed member having formed therein a central opening and a plurality of smaller openings communicating with said central opening, and a plurality of lugs formed on one face of said preformed member and individually disposed in the immediate outer area of each of said smaller openings to confine the movement of the wire as it is wound in stator slots, certain of said lugs having a shear section to facilitate removal of a part thereof.

10. A preformed member adapted to be attached to a stator having slots for receiving wire to be wound in the stator slots, comprising a body portion having a plurality of lugs with shoulders thereon extending from one face of said body portion and disposed in the immediate area of the stator slots to confine the wire as it is found in the stator slots.

11. A preformed member adapted to be attached to a stator having slots for receiving wire to be wound in the stator slots, comprising a body portion having a plurality of slots adapted to register with the slots in the stator, and a plurality of lugs with shoulders thereon extending from one face of said body portion and disposed in the immediate area of the slots to confine the wire as it is wound in the stator slots.

References Cited in the file of this patent

UNITED STATES PATENTS

| | | |
|---|---|---|
| 819,971 | Beck | May 8, 1906 |
| 1,803,493 | Volet | May 5, 1931 |

FOREIGN PATENTS

| | | |
|---|---|---|
| 710,366 | Germany | Sept. 11, 1941 |